United States Patent [19]
Billingham et al.

[11] Patent Number: 5,836,174
[45] Date of Patent: Nov. 17, 1998

[54] CRYOGENIC RECTIFICATION SYSTEM FOR PRODUCING MULTI-PURITY OXYGEN

[75] Inventors: John Fredric Billingham, Tonawanda; Michael James Lockett; Dante Patrick Bonaquist, both of Grand Island, all of N.Y.

[73] Assignee: Praxair Technology, Inc., Danbury, Conn.

[21] Appl. No.: 866,263

[22] Filed: May 30, 1997

[51] Int. Cl.⁶ .................................................... F25J 3/02
[52] U.S. Cl. ............................................. 62/643; 62/903
[58] Field of Search ........................... 62/643, 648, 900, 62/902, 903, 905

[56] References Cited

U.S. PATENT DOCUMENTS

| | | |
|---|---|---|
| 2,471,134 | 5/1949 | Wright ..................................... 196/100 |
| 3,113,854 | 12/1963 | Bernstein . |
| 3,210,951 | 10/1965 | Gaumer, Jr. . |
| 4,337,070 | 6/1982 | Rhode ....................................... 62/643 |
| 4,615,716 | 10/1986 | Cormier et al. .......................... 62/643 |
| 5,315,833 | 5/1994 | Ha et al. . |
| 5,339,648 | 8/1994 | Lockett et al. . |
| 5,349,824 | 9/1994 | Ha et al. . |
| 5,463,871 | 11/1995 | Cheung . |
| 5,546,767 | 8/1996 | Dray et al. ................................ 62/646 |
| 5,582,032 | 12/1996 | Shelton et al. ............................ 62/643 |
| 5,669,236 | 9/1997 | Billingham et al. ...................... 62/643 |

*Primary Examiner*—Christopher Kilner
*Attorney, Agent, or Firm*—Stanley Ktorides

[57] ABSTRACT

A cryogenic rectification system employing two rectifying sections in parallel within either the lower pressure column of a double column or in a side column, for producing product oxygen at both low and high purity.

10 Claims, 3 Drawing Sheets

5,836,174

CRYOGENIC RECTIFICATION SYSTEM FOR PRODUCING MULTI-PURITY OXYGEN

TECHNICAL FIELD

This invention relates generally to the cryogenic rectification of feed air to produce oxygen and, more particularly, to the production of low purity and high purity oxygen.

BACKGROUND ART

The demand for low purity oxygen is increasing in applications such as glassmaking, steelmaking and energy production. Low purity oxygen is generally produced in large quantities by the cryogenic rectification of feed air in a double column wherein feed air at the pressure of the higher pressure column is used to reboil the liquid bottoms of the lower pressure column and is then passed into the higher pressure column.

Some users of low purity oxygen, for example integrated steel mills, often require some high purity oxygen in addition to low purity oxygen. Such dual purity production cannot be efficiently accomplished with a conventional low purity oxygen plant.

Accordingly, it is an object of this invention to provide a cryogenic rectification system which can effectively and efficiently produce both low purity oxygen and high purity oxygen.

The above and other objects, which will become apparent to those skilled in the art upon a reading of this disclosure, are attained by the present invention, one aspect of which is:

A method for producing high purity oxygen and low purity oxygen comprising:
 (A) condensing feed air and passing the resulting feed air into a higher pressure column;
 (B) separating the feed air within the higher pressure column by cryogenic rectification into oxygen-enriched liquid and nitrogen-enriched vapor;
 (C) passing oxygen-enriched liquid from the higher pressure column into a lower pressure column and producing nitrogen-rich vapor and oxygen-richer liquid within the lower pressure column;
 (D) passing oxygen-containing liquid into a side column having a first product portion and a second product portion separated by a longitudinally oriented partition, processing the oxygen-containing liquid in each of the first product portion and the second product portion of the side column by cryogenic rectification and producing high purity oxygen in the first product portion and low purity oxygen in the second product portion;
 (E) reboiling the first product portion by a first portion of said condensing feed air and reboiling the second product portion by a second portion of said condensing feed air; and
 (F) recovering high purity oxygen from the first product portion and recovering low purity oxygen from the second product portion.

Another aspect of the invention is:

Apparatus for producing high purity oxygen and low purity oxygen comprising:
 (A) a first column;
 (B) a second column having a column section comprising a first product portion and a second product portion separated by a longitudinally oriented partition;
 (C) a first reboiler located within the first product portion, and a second reboiler located within the second product portion;
 (D) means for passing feed air into the first reboiler and from the first reboiler into the second reboiler;
 (E) means for passing feed air from the second reboiler into the first column; and
 (F) means for recovering high purity oxygen from the first product portion and means for recovering low purity oxygen from the second product portion.

A further aspect of the invention is:

A method for producing high purity oxygen and low purity oxygen comprising:
 (A) condensing feed air and passing the resulting feed air into a higher pressure column;
 (B) separating the feed air within the higher pressure column by cryogenic rectification into oxygen-enriched liquid and nitrogen-enriched vapor;
 (C) passing oxygen-enriched liquid from the higher pressure column into a lower pressure column having a first product portion and a second product portion separated by a longitudinally oriented partition;
 (D) processing oxygen-enriched liquid in each of the first product portion and the second product portion of the lower pressure column by cryogenic rectification, and producing high purity oxygen in the first product portion and low purity oxygen in the second product portion;
 (E) reboiling the first product portion by a first portion of said condensing feed air and reboiling the second product portion by a second portion of said condensing feed air; and
 (F) recovering high purity oxygen from the first product portion and recovering low purity oxygen from the second product portion.

As used herein, the term "feed air" means a mixture comprising primarily oxygen and nitrogen, such as ambient air.

As used herein, the term "low purity oxygen" means a fluid having an oxygen concentration within the range of from 50 to 99 mole percent.

As used herein, the term "high purity oxygen" means a fluid having an oxygen concentration greater than 99 mole percent.

As used herein, the term "column" means a distillation or fractionation column or zone, i.e. a contacting column or zone, wherein liquid and vapor phases are countercurrently contacted to effect separation of a fluid mixture, as for example, by contacting of the vapor and liquid phases on a series of vertically spaced trays or plates mounted within the column and/or on packing elements such as structured or random packing. For a further discussion of distillation columns, see the Chemical Engineer's Handbook, fifth edition, edited by R. H. Perry and C. H. Chilton, McGraw-Hill Book Company, New York, Section 13, *The Continuous Distillation Process*. The term, double column is used to mean a higher pressure column having its upper end in heat exchange relation with the lower end of a lower pressure column. A further discussion of double columns appears in Ruheman "The Separation of Gases", Oxford University Press, 1949, Chapter VII, Commercial Air Separation.

Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling)

component will tend to concentrate in the liquid phase. Partial condensation is the separation process whereby cooling of a vapor mixture can be used to concentrate the volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases is generally adiabatic and can include integral (stagewise) or differential (continuous) contact between the phases. Separation process arrangements that utilize the principles of rectification to separate mixtures are often interchangeably termed rectification columns, distillation columns, or fractionation columns. Cryogenic rectification is a rectification process carried out at least in part at temperatures at or below 150 degrees Kelvin (K).

As used herein, the term "indirect heat exchange" means the bringing of two fluid streams into heat exchange relation without any physical contact or intermixing of the fluids with each other.

As used herein the term "reboiler" means a heat exchange device which generates column upflow vapor from column liquid.

As used herein, the term "reboiling" means vaporizing column liquid by indirect heat exchange with cooling and/or condensing fluid.

As used herein, the terms "upper portion" and "lower portion" of a column or column portion mean those sections of the column or column portion respectively above and below the mid point of the column or column portion.

As used herein, the term "side column" means a column which processes fluid taken from one or both columns of a double column.

As used herein, the term "structured packing" means packing wherein individual members have specific orientation relative to each other and to the column axis.

As used herein, the term "equilibrium stage" means a vapor-liquid contacting stage whereby the vapor and liquid leaving the stage are in mass transfer equilibrium, e.g. a tray having 100 percent efficiency or a packing element height equivalent to one theoretical plate (HETP).

As used herein, the term "longitudinally oriented" means in the direction of the major axis of the column.

As used herein, the terms "liquid to vapor ratio" and "L/V" mean the ratio of the quantity of liquid flow down a column to the quantity of vapor rising in the column.

DETAILED DESCRIPTION

In general, the invention comprises the use of two stripping sections in parallel in a side column or in the lower pressure column of a double column plant. The two stripping sections process oxygen-containing liquid and are both reboiled by higher pressure feed air. One stripping section is operated at a lower liquid to vapor ratio and/or with a greater number of equilibrium stages than the other stripping section and accordingly produces high purity oxygen by the cryogenic rectification of the oxygen-containing liquid.

Figure 2:
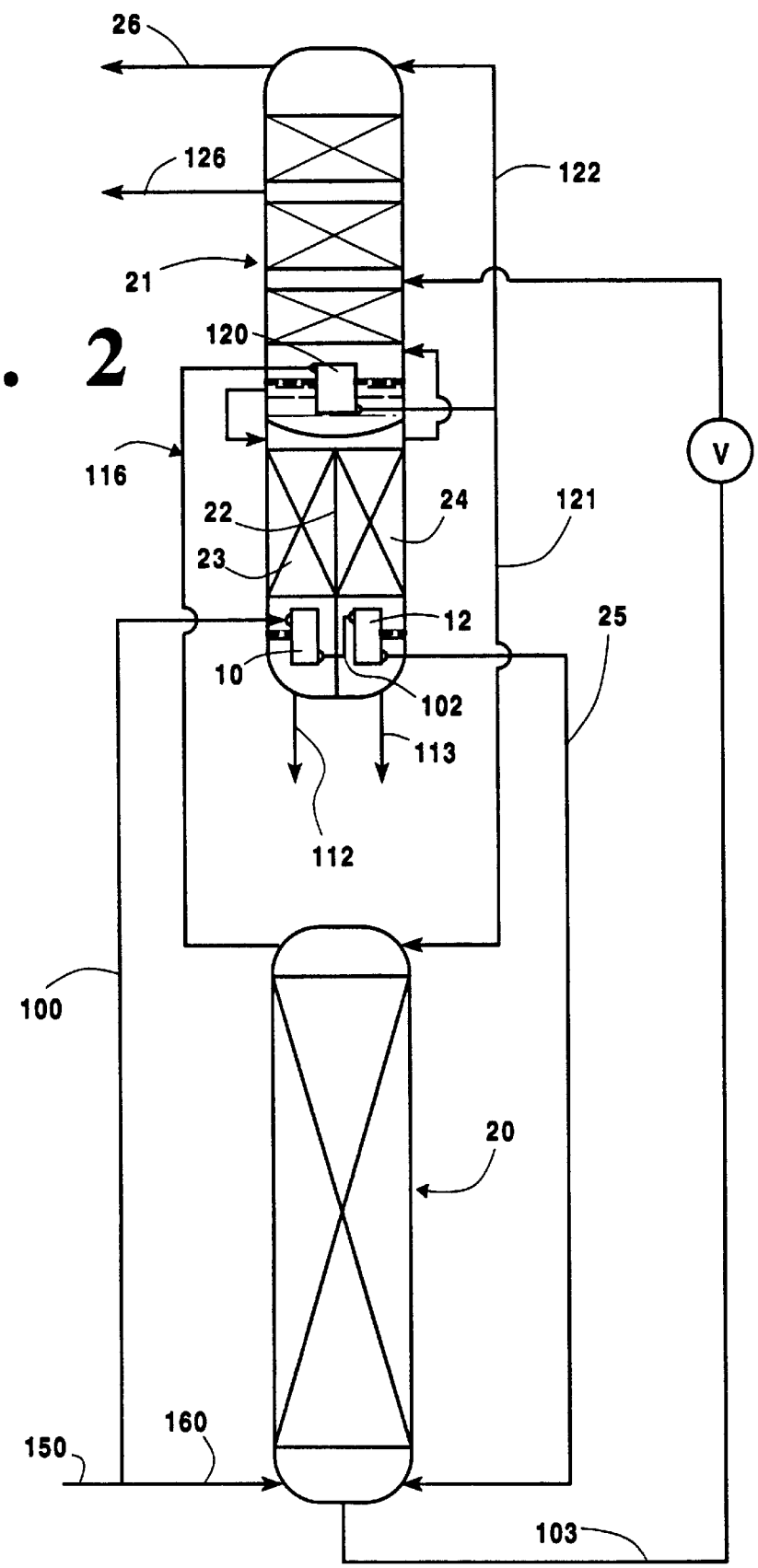
FIG. 2 is a simplified schematic representation of another preferred embodiment of the invention.

The invention will be described in greater detail with reference to the Drawings. Referring now to FIG. 2, feed air 150, which has been cleaned of high boiling impurities such as water vapor and carbon dioxide, and which is at an elevated pressure generally within the range of from 50 to 150 pounds per square inch absolute (psia), is divided into first portion 100 and second portion 160. First portion 100 is passed into first reboiler 10 wherein a first portion is condensed by indirect heat exchange with bottom liquid as will be more fully described below. Resulting partially condensed feed air 102 is passed into second reboiler 12 wherein another portion is condensed by indirect heat exchange with bottom liquid. Resulting at least partially condensed feed air 25 is passed into first or higher pressure column 20 which is part of a double column system which also comprises second or lower pressure column 21. Second feed air portion 160 is passed directly into higher pressure column 20. If desired, some of the feed air in stream 25 may be passed directly into the lower pressure column.

Higher pressure column 20 is operating at a pressure generally within the range of from 50 to 150 psia. Within the higher pressure column the feed air is separated by cryogenic rectification into oxygen-enriched liquid and nitrogen-enriched vapor. Oxygen-enriched liquid, which generally has an oxygen concentration within the range of from 30 to 55 mole percent, is passed from the lower portion of higher pressure column 20 in stream 103 and fed into lower pressure column 21 as the oxygen-containing liquid.

Lower pressure column 21 is operating at a pressure less than that of higher pressure column 20 and generally within the range of from 15 to 35 psia. Lower pressure column 21 has a longitudinally oriented partition 22 which defines a column section comprising a first product portion 23 and a second product portion 24. First reboiler 10 is located in the lower portion of first product portion 23. Second reboiler 12 is located in the lower portion of second product portion 24. Oxygen-enriched liquid 103 is fed into lower pressure column 21 above at least some of the partitioned column section. Preferably, as illustrated in FIG. 2, oxygen-enriched liquid 103 is fed into lower pressure column 21 above all of the partitioned column section, i.e. at or above the top of the partitioned column section. In the embodiment of the invention illustrated in FIG. 2, the oxygen-enriched liquid first condenses nitrogen top vapor from the higher pressure column prior to passing into the partitioned section.

The oxygen-enriched liquid is passed down in parallel through each of first product portion 23 and second product portion 24 against upflowing vapor and in the process is separated by cryogenic rectification to form high purity oxygen and low purity oxygen respectively. The first product portion is operated at a lower liquid to vapor ratio and/or has a greater number of equilibrium stages than the second product portion enabling the production of the higher purity product. Preferably the column internals, i.e. the mass transfer elements, within first product portion 23 and second product portion 24 comprise structured packing.

High purity oxygen liquid pools at the bottom of first product portion 23 and is reboiled by the first portion of feed air 100 to produce upflowing vapor within first product portion 23. Product high purity oxygen is recovered as liquid and/or gas from the first product portion 23 proximate first reboiler 10. In the embodiment illustrated in FIG. 2, high purity oxygen is withdrawn from first product portion 23 as liquid in stream 112 and recovered.

Low purity oxygen liquid pools at the bottom of second product portion 24 and is reboiled by a second condensing portion of feed air 100 to produce upflowing vapor within second product portion 24. Product low purity oxygen is recovered as liquid and/or gas from second product portion 24 proximate second reboiler 12. In the embodiment illustrated in FIG. 2, low purity oxygen is withdrawn from second product portion 24 as liquid in stream 113 and recovered.

Nitrogen-enriched fluid is withdrawn from higher pressure column 20 as stream 116 and passed into reboiler 120 located at an intermediate position within the lower pressure column. The nitrogen-enriched vapor is condensed in reboiler 120, a first portion 121 is passed back into higher pressure column 20 as reflux, and a second portion 122 is passed into lower pressure column 21 as reflux. A nitrogen-containing stream 26 is withdrawn from the upper portion of second column 21 and is generally waste nitrogen. Optionally, as illustrated in FIG. 2, the nitrogen containing stream 26 may be withdrawn as product and a waste nitrogen stream 126 may be withdrawn from the column at a point below the point where stream 26 is withdrawn.

Figure 1:
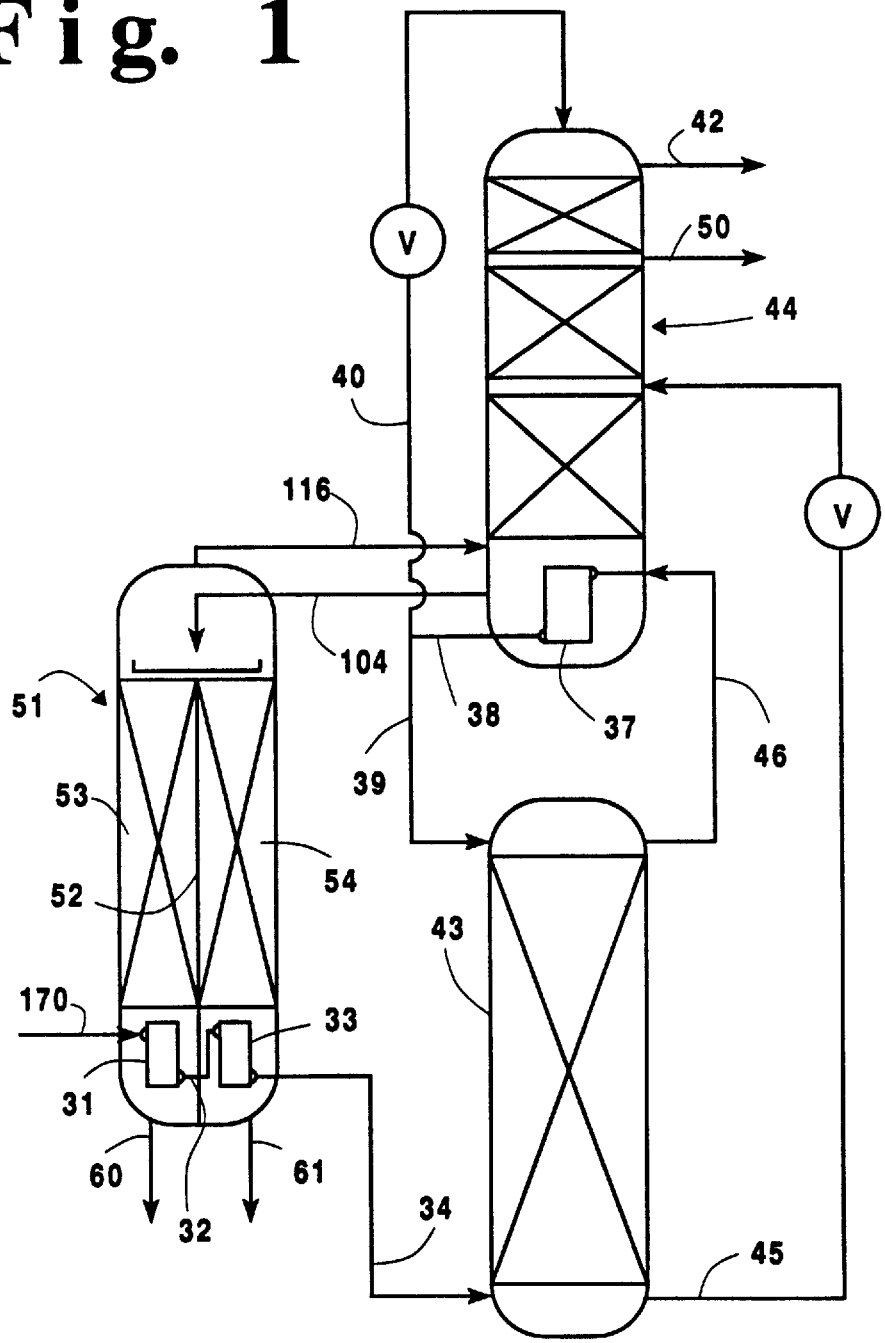
FIG. 1 is a simplified schematic representation of one preferred embodiment of the invention.

FIG. 1 illustrates another embodiment of the invention wherein the parallel stripping sections for producing high purity oxygen and low purity oxygen are located in a separate side column. Referring now to FIG. 1, feed air 170, which has been cleaned of high boiling impurities such as water vapor and carbon dioxide, and which is at an elevated pressure generally within the range of from 60 to 150 psia, is passed into first reboiler 31 wherein a first portion is condensed by indirect heat exchange with bottom liquid as will be more fully described below. Resulting partially condensed feed air 32 is passed into second reboiler 33 wherein another portion of the feed air is condensed by indirect heat exchange with bottom liquid. Resulting at least partially condensed feed air 34 is passed into first or higher pressure column 43 which is part of a double column system which also comprises third or lower pressure column 44. If desired, a portion of feed air 34 may be passed directly into the lower pressure column.

Higher pressure column 43 is operating at a pressure generally within the range of from 60 to 150 psia. Within higher pressure column 43 the feed air is separated by cryogenic rectification into oxygen-enriched liquid and nitrogen-enriched vapor. Oxygen-enriched liquid, which generally has an oxygen concentration within the range of from 30 to 55 mole percent, is passed from the lower portion of higher pressure column 43 in stream 45 into lower pressure column 44 which is operating at a pressure less than that of higher pressure column 34 and generally within the range of from 15 to 35 psia. Nitrogen-enriched vapor is passed from the upper portion of higher pressure column 43 in stream 46 into lower pressure column reboiler 37 wherein it is condensed by indirect heat exchange with lower pressure column bottom liquid. Resulting nitrogen-enriched liquid 38 is divided into first portion 39 which is passed into higher pressure column 43 as reflux, and into second portion 40 which is passed into lower pressure column 44 as reflux.

Within lower pressure column 44 the feeds are separated by cryogenic rectification into oxygen-richer fluid and nitrogen-rich vapor. Nitrogen-rich vapor is withdrawn from the upper portion of column 44 as stream 42 and may be recovered as product nitrogen. A waste nitrogen stream 50 is also withdrawn from column 44 below the top of the column for product purity control purposes.

An oxygen-richer liquid stream 104, having an oxygen concentration greater than that of the oxygen-enriched liquid and generally within the range of from 50 to 95 mole percent, is withdrawn from lower pressure column 44 and passed as oxygen-containing liquid into the upper portion of side or auxiliary column 51 which operates at a pressure generally within the range of from 17 to 35 psia.

Second or side column 51 has a longitudinally oriented partition 52 which defines a column section comprising a first product portion 53 and a second product portion 54. First reboiler 31 is located in the lower portion of first product portion 53. Second reboiler 33 is located in the lower portion of second product portion 54. Oxygen-richer liquid 104 is fed into side column 51 above at least some of the partitioned column section. Preferably, as illustrated in FIG. 1, oxygen-richer liquid 104 is fed into side column 51 above all of the partitioned column section, i.e. at or above the top of the partitioned column section.

The oxygen-richer liquid is passed down in parallel through each of first product portion 53 and second product portion 54 against upflowing vapor and in the process is separated by cryogenic rectification to form high purity oxygen and low purity oxygen respectively. The first product portion is operated at a lower liquid to vapor ratio and/or has a greater number of equilibrium stages than the second product portion enabling the production of the higher purity product. Preferably the column internals, i.e. the mass transfer elements, within first product portion 53 and second product portion 54 comprise structured packing.

High purity oxygen liquid pools at the bottom of first product portion 53 and is reboiled by the aforesaid condensing first portion of feed air 170 to produce upflowing vapor within first product portion 53. Product high purity oxygen is recovered as liquid and/or gas from the first product portion 53 proximate first reboiler 31. In the embodiment illustrated in FIG. 1, high purity oxygen is withdrawn from first product portion 53 as liquid in stream 60 and recovered.

Low purity oxygen liquid pools at the bottom of second product portion 54 and is reboiled by a second condensing portion of feed air 170 to produce upflowing vapor within second product portion 54. Product low purity oxygen is recovered as liquid and/or gas from second product portion 54 proximate second reboiler 33. In the embodiment illustrated in FIG. 1, low purity oxygen is withdrawn from second product portion 54 as liquid in stream 61 and recovered. A nitrogen-containing stream 116 is withdrawn from the upper portion of second column 51 and passed into lower pressure column 44.

Figure 3:
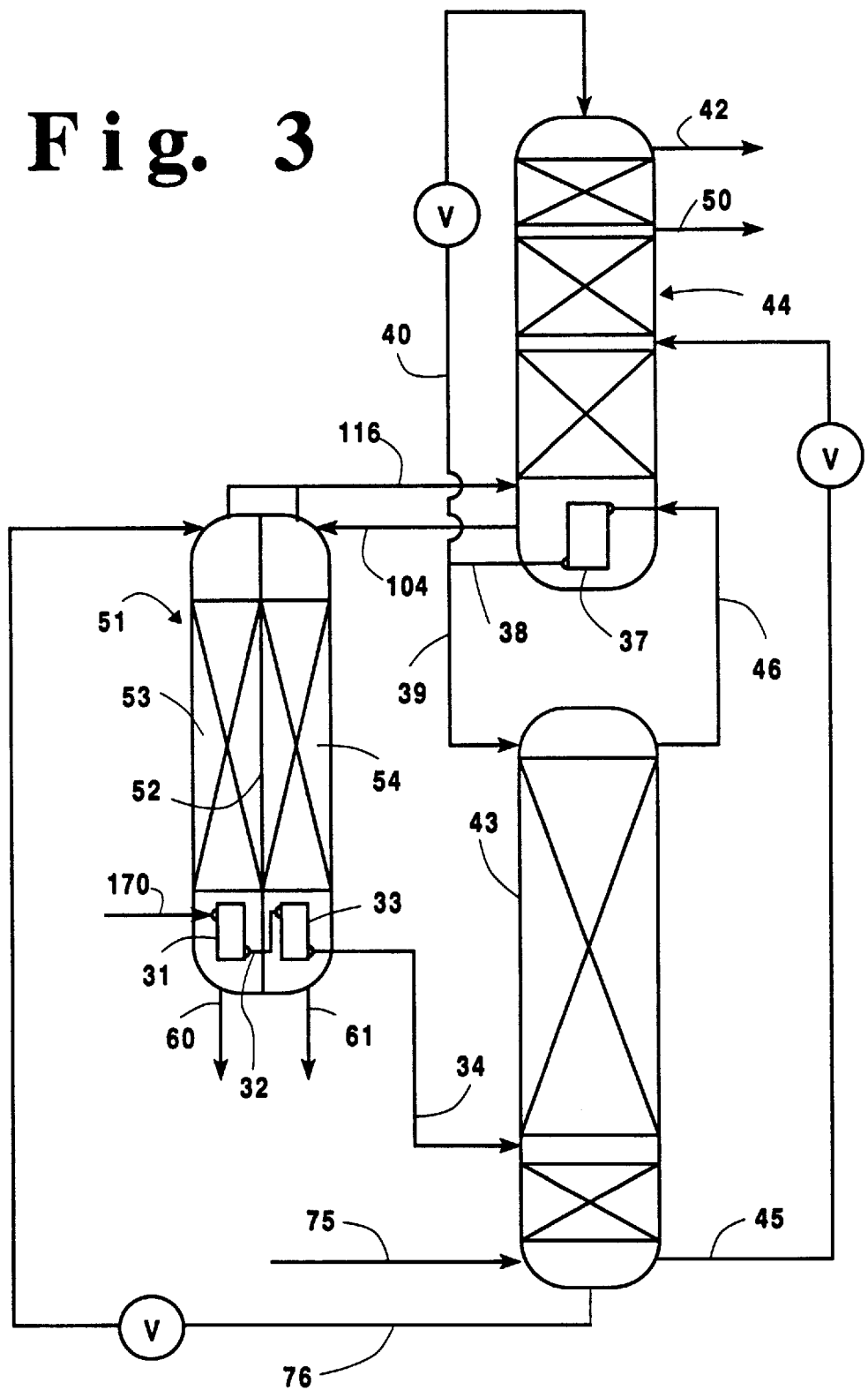
FIG. 3 is a simplified schematic representation of yet another preferred embodiment of the invention.

FIG. 3 illustrates another embodiment of the side column version of the invention. The numerals in FIG. 3 correspond to the numerals in FIG. 1 for the common elements and these common elements will not be discussed again in detail. In the embodiment illustrated in FIG. 3 the oxygen-containing liquid processed in the side column is taken from both lower pressure column 44 and higher pressure column 43.

Referring now to FIG. 3, condensed feed air stream 34 is passed into higher pressure column 43 above the bottom of the column, and additional feed air stream 75 is passed into higher pressure column 43 below the introduction level of stream 34. oxygen-richer stream 104 is passed from lower pressure column 44 into the second product portion of side column 51. In the embodiment of the invention illustrated in FIG. 3, partition 52 preferably extends through the entire height of column 51. A stream 76 of oxygen-enriched liquid, which has an oxygen concentration less than that of the oxygen-richer liquid in stream 104, is passed from higher pressure column 43 into the first product portion of side column 51. It is thus seen that in the embodiment of the invention illustrated in FIG. 3, the oxygen-containing liquid having the lower oxygen concentration, i.e. oxygen-enriched liquid 76, is used to produce high purity oxygen 60 in the first product portion, and the oxygen-containing liquid having the higher oxygen concentration, i.e. oxygen-richer liquid 104, is used to produce low purity oxygen 61 in the second product portion. Stream 116 is withdrawn from the upper portion of column 51 from each of first product portion 53 and second product portion 54 and then passed into lower pressure column 44.

The pressure of the higher pressure column is dictated by the need to condense the nitrogen-enriched vapor leaving the top of this column against a boiling oxygen-rich fluid in the lower pressure column. The purer the boiling oxygen, the greater the pressure required in the higher pressure column to generate the necessary temperature difference for condensation. By using feed air to reboil both the high purity and low purity stripping sections, the nitrogen overhead in the higher pressure column can be condensed by a fluid that is significantly leaner in oxygen than the lower purity oxygen product. Thus the pressure in the higher pressure column may be lower by the practice of this invention than would be the case were nitrogen overhead from the higher pressure column used to reboil the lower purity oxygen stripping section.

Now by the use of this invention one can effectively produce both high purity oxygen and low purity oxygen from a cryogenic air separation plant. Although the invention has been described in detail with reference to two preferred embodiments, those skilled in the art will recognize that there are other embodiments of the invention within the spirit and the scope of the claims. For example, the partitioned column may have more than one partition and the partitioned section may contain more than two product portions each with its own reboiler. In this way three or more oxygen products may be produced at different purity levels.

Moreover, the partitioned column useful in the practice of this invention may be defined generically as:

A rectification column for producing first product and second product comprising:
  (A) a column section having a partition longitudinally oriented within the column section which divides the column section into a first product portion and a second product portion;
  (B) a first reboiler located within the first product portion;
  (C) a second reboiler located within the second product portion;
  (D) means for passing feed into the column above at least some of the column section;
  (E) means for withdrawing first product from the column section proximate the first reboiler; and
  (F) means for withdrawing second product from the column section proximate the second reboiler.

What is claimed is:

1. A method for producing high purity oxygen and low purity oxygen comprising:
  (A) condensing feed air and passing the resulting feed air into a higher pressure column;
  (B) separating the feed air within the higher pressure column by cryogenic rectification into oxygen-enriched liquid and nitrogen-enriched vapor;
  (C) passing oxygen-enriched liquid from the higher pressure column into a lower pressure column and producing nitrogen-rich vapor and oxygen-richer liquid in the lower pressure column;
  (D) passing oxygen-containing liquid into a side column having a first product portion and a second product portion separated by a longitudinally oriented partition, processing the oxygen-containing liquid in each of the first product portion and the second product portion of the side column by cryogenic rectification and producing high purity oxygen in the first product portion and low purity oxygen in the second product portion;
  (E) reboiling the first product portion by a first portion of the said condensing feed air and reboiling the second product portion by a second portion of said condensing feed air; and
  (F) recovering high purity oxygen from the first product portion and recovering low purity oxygen from the second product portion.

2. The method of claim 1 wherein the liquid to vapor ratio in the first product portion is less than the liquid to vapor ratio in the second product portion.

3. The method of claim 1 wherein the oxygen-containing liquid comprises oxygen-richer liquid from the lower pressure column.

4. The method of claim 1 wherein the oxygen-containing liquid comprises oxygen-richer liquid from the lower pressure column and oxygen-enriched liquid from the higher pressure column, and wherein the oxygen-enriched liquid is passed into the first product portion and the oxygen-richer liquid is passed into the second product portion.

5. A method for producing high purity oxygen and low purity oxygen comprising:
  (A) condensing feed air and passing the resulting feed air into a higher pressure column;
  (B) separating the feed air within the higher pressure column by cryogenic rectification into oxygen-enriched liquid and nitrogen-enriched vapor;
  (C) passing oxygen-enriched liquid from the higher pressure column into a lower pressure column having a first product portion and a second product portion separated by a longitudinally oriented partition;
  (D) processing oxygen-enriched liquid in each of the first product portion and the second product portion of the lower pressure column by cryogenic rectification, and producing high purity oxygen in the first product portion and low purity oxygen in the second product portion;
  (E) reboiling the first product portion by a first portion of said condensing feed air and reboiling the second product portion by a second portion of said condensing feed air; and
  (F) recovering high purity oxygen from the first product portion and recovering low purity oxygen from the second product portion.

6. Apparatus for producing high purity oxygen and low purity oxygen comprising:
  (A) a first column;
  (B) a second column having a column section comprising a first product portion and a second product portion separated by a longitudinally oriented partition, and means for passing oxygen-containing liquid into the second column;
  (C) a first reboiler located within the first product portion, and a second reboiler located within the second product portion;
  (D) means for passing feed air into the first reboiler and from the first reboiler into the second reboiler;
  (E) means for passing feed air from the second reboiler into the first column; and (F) means for recovering high purity oxygen from the first product portion and means for recovering low purity oxygen from the second product portion.

7. The apparatus of claim 6 wherein the first product portion has more equilibrium stages than the second product portion.

8. The apparatus of claim 6 wherein the second column is the lower pressure column of a double column, the first column is the higher pressure column of the double column and the means for passing oxygen-containing liquid into the second column communicates with the first column.

9. The apparatus of claim 6 wherein the second column is a side column, and further comprising a third column wherein the means for passing oxygen-containing liquid into the second column communicates with the third column, and further comprising means for passing fluid from the first column into the third column.

10. The apparatus of claim 6 wherein the second column is a side column, and further comprising a third column wherein the means for passing oxygen-containing liquid into the second column communicates with the third column, and further comprising means for passing fluid from the lower portion of the first column into the first product portion of the side column and means for passing fluid from the first column into the third column.

* * * * *